United States Patent
Cazemier

(10) Patent No.: US 7,727,568 B2
(45) Date of Patent: Jun. 1, 2010

(54) ANTIMICROBIAL COMPOSITION COMPRISING A MIXTURE OF LACTIC ACID OR A DERIVATIVE THEREOF AND AN INORGANIC ACID

(75) Inventor: Anne Cazemier, Leerdam (NL)

(73) Assignee: Purac Biochem B.V., Gorichem (NL)

( * ) Notice: Subject to any disclaimer, the term of this patent is extended or adjusted under 35 U.S.C. 154(b) by 624 days.

(21) Appl. No.: 10/859,997

(22) Filed: Jun. 4, 2004

(65) Prior Publication Data

US 2005/0019461 A1   Jan. 27, 2005

Related U.S. Application Data

(60) Provisional application No. 60/475,789, filed on Jun. 5, 2003.

(51) Int. Cl.
 A23L 3/3463   (2006.01)
 A01N 25/34   (2006.01)

(52) U.S. Cl. .................... 426/335; 424/404

(58) Field of Classification Search ............ 424/78.37, 424/404; 426/335
See application file for complete search history.

(56) References Cited

U.S. PATENT DOCUMENTS

| | | | |
|---|---|---|---|
| 3,624,222 A | | 11/1971 | Nelson |
| 4,585,482 A | * | 4/1986 | Tice et al. ............... 106/15.05 |
| 5,462,714 A | * | 10/1995 | Talwalker et al. ............ 422/37 |
| 6,121,219 A | | 9/2000 | Herdt et al. |
| 6,342,528 B1 | * | 1/2002 | McKenzie et al. .......... 514/557 |
| 2003/0032566 A1 | * | 2/2003 | Pawson et al. .............. 510/130 |
| 2004/0018284 A1 | * | 1/2004 | Kuethe et al. ............... 426/326 |

FOREIGN PATENT DOCUMENTS

| | | | |
|---|---|---|---|
| GB | 1194863 | | 6/1970 |
| HU | 3 383 A | | 2/1990 |
| JP | A 04-334448 | | 11/1992 |
| WO | WO 96/24247 | | 8/1996 |
| WO | WO 96/24248 | | 8/1996 |
| WO | WO 99/51218 | * | 3/1999 |
| WO | WO 99/51218 | | 10/1999 |

OTHER PUBLICATIONS

Hanne Maribo et al., "Commercial Products for Weaned Piglets: Luctacid HC, Luctacid Piglets and Master-cid 90", Danish Pig Production, Report No. 474, Jun. 29, 2000, pp. 1-7.
Eugeni Roura, "Alternatives to Antibiotic Growth Promoters in Swine Feed", Lucta, (2001), pp. 1-15.

* cited by examiner

*Primary Examiner*—Sreeni Padmanabhan
*Assistant Examiner*—Umamaheswari Ramachandran
(74) *Attorney, Agent, or Firm*—Oliff & Berridge, PLC

(57) ABSTRACT

The invention relates to an antimicrobial composition comprising a mixture of at least 20 wt. % lactic acid or a derivative thereof and an inorganic acid selected from a nitrogen, sulfur, and phosphorous acid, and mixtures thereof for use in animal nutrition. In one of the embodiments the composition further comprises at least one other acid selected from acetic acid, fumaric acid, gluconic acid, (iso)butyric acid, sorbic acid, (iso)valeric acid, maleic acid, malic acid, capronic acid, benzoic acid, and citric acid. In a special embodiment the composition comprises lactic acid or polylactide, which is attached to a support.

13 Claims, No Drawings

ANTIMICROBIAL COMPOSITION COMPRISING A MIXTURE OF LACTIC ACID OR A DERIVATIVE THEREOF AND AN INORGANIC ACID

This non-provisional application claims the benefit of U.S. Provisional Application No. 60/475,789, filed June 5, 2003.

This invention relates to the use of antimicrobial compositions comprising a mixture of lactic acid or a derivative thereof and an inorganic acid, its use in a nutrition composition for animals, and its use for making a composition for treating or preventing infections in animals, especially poultry.

It is known to administer antibiotics to animals to protect them from infection by bacteria such as e.g. *E. coli*. It is also known to add such antibiotics to animal nutrition. However, there is an increasing resistance in using antibiotics, and many countries have legislation that prohibits the use of antibiotics in animal feed nowadays. Moreover, antibiotics are relatively expensive and they have to be administered in very controlled amounts. In order to avoid such method of protecting animals other additives for preventing infection are proposed. For instance, a composition comprising benzoic acid or a derivative of benzoic acid capable of giving rise to free benzoic acid in vivo was proposed for use as a medicament for animals in WO 96/24248. However, benzoic acid has relatively low solubility in aqueous systems. In WO 99/51218 an improvement of this method was proposed with a biocidal composition of a blend of acids substantially free of benzoic acid or a derivative thereof comprising a mixture of lactic acid and at least one other acid selected from formic acid, acetic acid and propionic acid. This blend is reported to be effective in pigs but it was now found that the blend is ineffective in poultry. Moreover, such blend with lactic acid, formic acid and propionic acid has a bad taste (due to the bad taste of propionic acid), and therefore cannot be used an animals that are sensitive to such taste. In GB 1,194,863 crop preservative composition is described comprising 70 wt. % phosphoric acid, 20 wt. % propionic acid and 5 wt. % lactic acid. Crops treated with this composition may be fed to fowls. Also in this composition propionic acid is present which results in a bad taste. In HU 3383 a composition is described for treatment of animal fodder. Said composition comprises lactic acid producing bacteria, urea, phosphoric acid, polysaccharide and clay mineral. With such a lactic acid producing bacteria, lactic acid concentrations of at most 10 wt. % can be obtained in the composition, because the formation of lactic acid will cause a drop in pH, which damages the bacteria's metabolic process and thus stops the lactic acid production. It is therefore an objective of the present invention to provide a composition with antimicrobial properties that is free from antibiotics and can nevertheless be effectively used in a variety of animals, including poultry, and is ingested without problems by the animal.

It was found that a composition comprising a mixture of at least 20 wt. % (based on the total composition) lactic acid or a derivative thereof and an inorganic acid selected from a nitrogen, sulfur, and phosphorous acid, and mixtures thereof possesses antimicrobial properties and can be applied in animal nutrition for treating and preventing microbial infection in animals, particularly in animals with a single stomach such as pigs and rabbits, and in poultry including chicken, quail, guinea fowl, turkey, ostrich, duck, goose, pheasant, and the like.

It was further found that the present composition when used in animal nutrition is able to promote growth, improves feed to gain ratio, increase growth of lactic acid bacteria, and improve digestibility of amino acids in animal feeds, whereas the composition did not adversely affect the animal health.

With respect to the invention the term "lactic acid or a derivative thereof" means lactic acid, lactic esters, more particularly C1-C25 esters such as methyl, ethyl, ethylhexyl or octadecyl esters of lactic acid, lactylates according to Formula 1 below such as sodium stearyl lactylate and calcium lauryl lactylate, lactate and lactate salts, such as alkali metal, alkaline earth metal, ammonium, ferrous, aluminum, copper, zinc, and manganese salts of lactate, dilactate, oligolactate, and polylactate.

Formula 1:

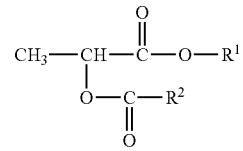

wherein $R^1$ stands for H or $CH(CH_3)$—COOH, $R^2$ stands for a C1-C35 alkyl or alkenyl group, which is either branched or unbranched;

or a Na, Ca, Fe(II), Zn, Mn, $NH_4$, Al, or Cu(II)salt thereof.

The inorganic acid selected from a nitrogen, sulfur, and phosphorous acid, and mixtures thereof are, for instance, nitric acid, sulfuric acid, sulfurous acid, (ortho)phosphoric acid, pyrophosphoric acid, chloric acid, and the like. The most preferred inorganic to be used in the invention is orthophosphoric acid.

The composition according to the invention preferably also comprises at least one other acid selected from acetic acid, fumaric acid, gluconic acid, (iso)butyric acid, sorbic acid, (iso)valeric acid, maleic acid, malic acid, capronic acid, benzoic acid, and citric acid. Most preferably, acetic acid is added as the additional acid. Because of its bad taste propionic acid is preferably only present in low amounts (less than 15 wt. %, more preferably less than 5 wt. %), and most preferably not or virtually not present at all. The composition may be administered to animals as a component of a conventional animal feed composition. In the context of this invention the term "animal nutrition" includes solid feed and liquid feed, such as drinking water. Thus, the antimicrobial composition may be administered to an animal as a solid or liquid component of a conventional animal feed composition or in their drinking water. It has been found very advantageous to administer the antimicrobial composition according to the invention to the drinking water of poultry, previous to their transport to the slaughterhouse as to keep them *salmonella*-poor.

Without being bound to the theory, it is believed that lactic acid or a derivative thereof disrupts the outer membrane of pathogens making the membrane permeable to lactic acid and other acids, such as acetic acid. The inorganic acid is believed to lower the pH in the chymus during total passage in the animal, thereby increasing the presence of non-dissociated lactic acid and other acids, such as acetic acid.

In another preferred embodiment the lactic acid or its derivative is attached to a support. This provides a convenient way to obtain the antimicrobial composition in solid powdered form. Suitable supports are selected from vegetable fiber material, vegetable carbohydrates such as cellulose, and mineral supports such as silica, starch, gypsum, and lime. Most preferably, such lactic acid (derivative) is a polylactates. Such composition is only slightly digestible and is able to enter the small intestine (duodenum) of the animal wherein it is hydrolyzed to lactic acid, thereby preventing back migration of *E-coli* bacteria. Preferably, the composition of this embodiment further comprises an inorganic acid, preferably orthophosphoric acid, thereby lowering the pH in the intestine, crop and gizzard, as explained hereinbefore.

The amount of lactic acid and other acids present in such a composition may vary within a wide range. However, the amount of lactic acid in the composition should be at least 20 wt. % of the total composition to be effective, preferably between 50-99 wt. %, and more preferably between 60-90 wt. % of the total composition. Lactic acid and other suitable acids are usually sold commercially as aqueous solutions. For instance, lactic acid is sold as a 70% by weight solution whereas acetic acid is sold as a 10-80% by weight aqueous solution. Orthophosphoric acid is sold as an 85% by weight aqueous solution of phosphoric acid, and nitric acid and sulfuric acid can be obtained in concentrated as well in diluted form.

The weight ratio of lactic acid to the inorganic acid in such an antimicrobial composition is suitably in the range from 99:1 to 1:99, preferably from 90:10 to 10:90 and more preferably from 80:20 to 20:80.

The amount of the antimicrobial composition administered to the animal is suitably such that it is sufficient to prevent/ cure any infection in the animal in its capacity as a biocide. Such an amount is suitably in the range from 0.001-5% based on the total weight of each feed fed to the animal.

This amount may, however, be higher if the function of the antimicrobial functions inter alia as an antimicrobial, promotes growth, improves feed to gain ratio, and improves digestibility of amino acids administered in animal feeds.

As mentioned above the antimicrobial composition may be administered to animals as a component of a conventional animal feed composition. A conventional animal feed composition may comprise wheat, starch, meat and bone meal, maize, sunflower meal, corn, etcetera.

The composition according to the invention may further comprise the additives composition is not only to act as an antimicrobial but also to control the pH of the animal excreta fed on such a diet in order to suppress the emission of ammonia from the excreta. Such higher amounts are suitably limited to a maximum of about 10% based on the total animal feed composition. The antimicrobial composition that are commonly added to animal nutrition, such as one or more ingredients selected from calcium salts such as carbonates, phosphates and sulfates, electrolytes, proteins, amino acids, pre- and probiotics, plant extracts, ethereal oils, animal fat, vitamins and (trace) minerals.

The invention is further illustrated by the following non-limitative examples, which show the inventive merits of this invention

GENERAL

A typical formulation for an animal feed composition is shown in the

Tables below in which all the amounts shown in % w/w were fed to chickens, wherein Control is feed without lactic acid and orthophosphoric acid LAFEED™ 80 is feed with 80% lactic acid without orthophosphoric acid.

LAFEED™ 80+ROPA is feed with 80% lactic acid and oregano oil.

Purac Extra is feed with 80% lactic acid, 10% orthophosphoric acid and 10% acetic acid.

Biocite™ is feed of citrus oil

Calprona™ LF is feed with 80% lactic acid and 20% formic acid.

Animals

624 Ross 308 roosters were divided at random over 48 cages (13 roosters/cage). At an age of 10 days the number of roosters is lowered to 11 roosters per cage. The animals were vaccinated according to the following scheme.

Scheme

| age (days) | type of vaccination | administration |
|---|---|---|
| 1 | NCD/IB (Clone 30/MA5) | Spray |
| 14 | Gumboro (228E, 1 dosage) | drinking water |
| 18 | NCD (Clone 30) | Spray |

Cages

The floors of the cages are provided with used litter to increase the chance to obtain infection. The room was mechanically ventilated and heated by central heating at 34° C. at the start, which temperature was gradually lowered to 20° C. at day 29, and thereafter maintained at 20° C. The cages were lighted by means of TL tubes. On day 1 and 2 the cages were lighted continuously, thereafter a day/night scheme of 18 hours light and 6 hours darkness was applied.

Feed

The following feed compositions were used.

|  | Feed I | Feed II |
|---|---|---|
| wheat | 27.96 | 35.60 |
| maize | 20.00 | 15.19 |
| sunflower seed extracted | 2.31 | 2.86 |
| soja bean heat treated | — | 6.48 |
| soja bean extracted | 31.79 | 26.68 |
| tapioca | 3.00 | 2.39 |
| lupins | 4.54 | — |
| animal fat | 4.00 | 5.50 |
| Soja bean oil | 1.55 | 1.51 |
| premix | 1.00 | 1.00 |
| limestone | 1.07 | 0.75 |
| monocalcium phosphate | 1.09 | 0.59 |
| sodium hydrogen carbonate | 0.16 | 0.16 |
| L-lysine HCl | 0.35 | 0.33 |
| L-threonine | 0.31 | 0.26 |
| fytase | 0.37 | 0.20 |
| clinacox | 0.50 | 0.50 |

The roosters were allowed to drink and eat unlimited.

Treatment Groups

Treatment groups 1-6 were given Feed I (days 1-10) or Feed II (days 11-31) in addition to an additional composition (except Control group 1) as follows.

| treatment group | days 1-10 Feed I and additional composition | days 1-10 Feed II and additional composition |
|---|---|---|
| 1 | — | — |
| 2 | 1.5% LAFEED 80 | 0.75% LAFEED 80 |
| 3 | 1.5% LAFEED 80 + 0.05% ROPA | 0.75% LAFEED 80 + 0.025% ROPA |
| 4 | 1.5% Purac Extra | 0.75% Purac Extra |
| 5 | 0.2% Biocite | 0.2% Biocite |
| 6 | 2.0% Calprona LF | 1.0% Calprona LF |

Performance

TABLE 1

Growth, mortality, feed consumption (Feed I) and
feed conversion ratio in the starter period (1-10 days)

|  | 1 Control | 2 LAFEED 80 | 3 LAFEED 80 + ROPA | 4 Purac Extra | 5 Biocite | 6 Calprona LF |
|---|---|---|---|---|---|---|
| Bodyweight day 0 (g) | 40.8 | 41.2 | 41.8 | 41.4 | 41.8 | 41.5 |
| Bodyweight day 10 (g) | 247 | 248 | 244 | 252 | 251 | 252 |
| Growth (g) | 206 | 207 | 202 | 211 | 209 | 211 |
| Mortality (%) | 0.0 | 1.0 | 1.0 | 0.0 | 0.0 | 0.0 |
| FCR* | 1.395 | 1.401 | 1.340 | 1.339 | 1.365 | 1.376 |
| Feed consumption (g/d) | 28.8 | 29.0 | 27.1 | 28.3 | 28.5 | 29.0 |
| Feed consumption (g) | 288 | 290 | 271 | 283 | 285 | 290 |

*FCR = feed consumption ratio (= feed consumption/growth)

The results of Table 1 show that with Purac Extra a low mortality combined with an optimal feed efficiency is obtained.

TABLE 2

Growth, mortality, feed consumption (Feed II)
and feed conversion ratio in the grower period (11-31 days)

|  | 1 Control | 2 LAFEED 80 | 3 LAFEED 80 + ROPA | 4 Purac Extra | 5 Biocite | 6 Calprona LF |
|---|---|---|---|---|---|---|
| Bodyweight day 31 (g) | 1727 | 1740 | 1698 | 1758 | 1716 | 1715 |
| Growth (g) | 1477 | 1489 | 1453 | 1504 | 1463 | 1462 |
| Mortality (g) | 1.1 | 2.3 | 1.1 | 3.4 | 3.4 | 1.1 |
| FCR | 1.652 | 1.646 | 1.661 | 1.635 | 1.698 | 1.681 |
| Feed consumption (g/d) | 116.0 | 116.8 | 114.8 | 117.1 | 118.0 | 117.0 |
| Feed consumption (g) | 2436 | 2452 | 2411 | 2458 | 2478 | 2457 |

The results of Table 2 show that with Purac Extra an acceptable mortality combined with an optimal feed efficiency is obtained.

The invention claimed is:

1. An antimicrobial composition comprising a mixture of a first component consisting of either (a) at least 50% by weight lactic acid or a derivative thereof based on total composition, or (b) at least 50% by weight lactic acid or a derivative thereof based on total composition in mixture with at least one acid selected from the group consisting of acetic acid, fumaric acid, gluconic acid, (iso)butyric acid, sorbic acid, (iso)valeric acid, maleic acid, malic acid, capronic acid, benzoic acid, and citric acid; and
an inorganic acid selected from a nitrogen atom-containing acid, a sulfur atom-containing acid, and a phosphorous atom-containing acid, and mixtures thereof,
and wherein the composition is substantially free to completely free of propionic acid.

2. The antimicrobial composition of claim 1 wherein the inorganic acid is a phosphorous atom-containing acid.

3. The antimicrobial composition of claim 1 wherein the lactic acid or a derivative thereof is attached to a support.

4. The antimicrobial composition of claim 3 wherein the support is selected from vegetable fiber, cellulose, silica, starch, gypsum, and lime.

5. An animal nutrition composition comprising the antimicrobial composition of claim 1.

6. A process for making a nutrition composition for animals, comprising adding the composition of claim 1 to animal fodder.

7. A process for making the nutrition composition according to claim 6, wherein the animal fodder is poultry fodder.

8. A process for making an animal feed composition for treating microbial infection in animals, comprising adding the antimicrobial composition of claim 1 to produce the animal feed composition for treating microbial infection.

9. The antimicrobial composition of claim 2 wherein the phosphorous atom-containing acid is (ortho)phosphoric acid.

10. A method for treating microbial infection in an animal, the method comprising:
administering to the animal a feed composition comprising the antimicrobial composition of claim 1 in an amount sufficient to treat the microbial infection.

11. The antimicrobial composition of claim 1, wherein the first component consists of the at least 50% by weight lactic acid or a derivative thereof based on total composition in mixture with at least one acid selected from the group consisting of acetic acid, fumaric acid, gluconic acid, (iso)butyric acid, sorbic acid, (iso)valeric acid, maleic acid, malic acid, capronic acid, benzoic acid, and citric acid.

12. The antimicrobial composition of claim 1, wherein the lactic acid or the derivative thereof comprises between 50 and 99 wt. % based on the total composition.

13. The antimicrobial composition of claim 1, wherein the lactic acid or the derivative thereof comprises between 60 and 90 wt. % based on the total composition.

* * * * *